(12) United States Patent
Chen et al.

(10) Patent No.: US 9,151,909 B2
(45) Date of Patent: Oct. 6, 2015

(54) OPTICAL FIBER CONNECTOR

(71) Applicant: Molex Incorporated, Lisle, IL (US)

(72) Inventors: Wenzong Chen, Naperville, IL (US); Scot Ernst, Plainfield, IL (US); Igor Kuprin, Buffalo Grove, IL (US); Brian Smith, Aurora, IL (US); Joanna Szewczyk, Mielec (PL); Mark Matuszewski, Elmhurst, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/490,020

(22) Filed: Sep. 18, 2014

(65) Prior Publication Data

US 2015/0003787 A1    Jan. 1, 2015

Related U.S. Application Data

(62) Division of application No. 13/391,547, filed as application No. PCT/US2010/046365 on Aug. 23, 2010, now Pat. No. 8,864,390.

(60) Provisional application No. 61/235,914, filed on Aug. 21, 2009.

(51) Int. Cl.
*G02B 6/38* (2006.01)
*G02B 6/36* (2006.01)

(52) U.S. Cl.
CPC ............ *G02B 6/3893* (2013.01); *G02B 6/3616* (2013.01); *G02B 6/381* (2013.01); *G02B 6/3807* (2013.01); *G02B 6/387* (2013.01); *G02B 6/3809* (2013.01)

(58) Field of Classification Search
USPC ............... 385/72, 76–78, 81, 86–87, 71, 137; 439/159, 354
See application file for complete search history.

(56) References Cited

U.S. PATENT DOCUMENTS

| | | |
|---|---|---|
| 5,352,133 A | 10/1994 | Sampson |
| 6,821,024 B2 | 11/2004 | Bates |
| 7,329,137 B2 | 2/2008 | Martin et al. |
| 8,152,385 B2 | 4/2012 | de Jong et al. |
| 2003/0190123 A1 | 10/2003 | Kahle et al. |
| 2004/0047565 A1 | 3/2004 | Cheng et al. |
| 2008/0112682 A1 | 5/2008 | Ishii et al. |

*Primary Examiner* — Ellen Kim

(57) ABSTRACT

An optical fiber connector includes a housing with at least one elongated cylindrical cavity, a fiber holder within the cavity including a ferrule which secures an optical fiber therein and a biasing member engaging the fiber holder to bias the ferrule towards an unmated position. A resilient metal latch is mounted on the housing for releasably securing the optical fiber connector to another component. A latch travel limiting structure prevents the latch from deflecting outside a desired predetermined path. Improved structures for mounting the latch on the housing and for creating a duplex connector assembly are also provided.

14 Claims, 12 Drawing Sheets

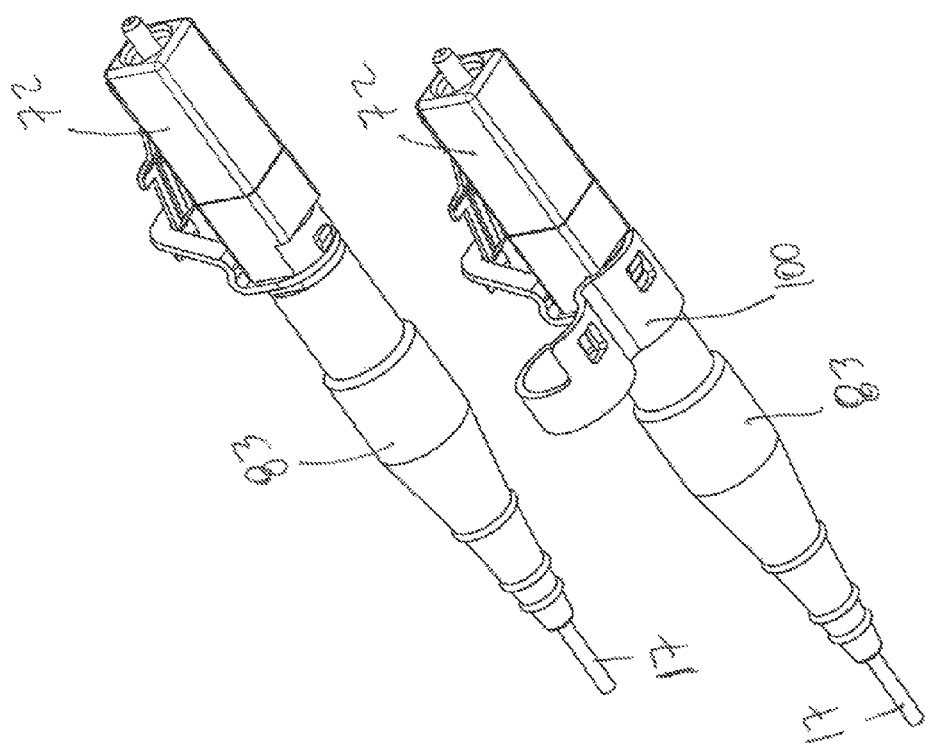

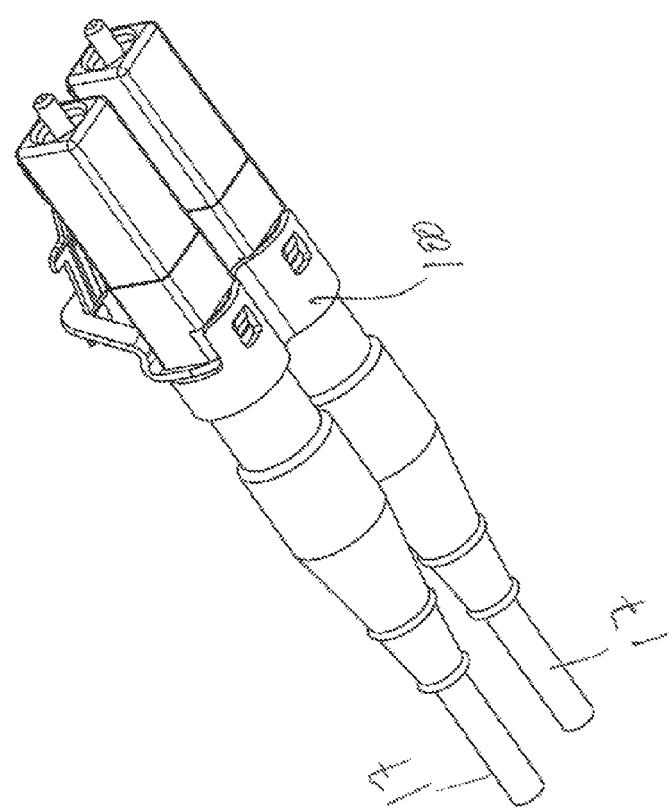

OPTICAL FIBER CONNECTOR

REFERENCE TO RELATED APPLICATIONS

The Present Disclosure is a Divisional Application of U.S. patent application Ser. No. 13/391,547, filed with the U.S. Patent And Trademark Office (USPTO) on 21 Feb. 2012, now U.S. Pat. No. 8,864,390, entitled "Optical Fiber Connector." The '547 Application is a National Phase Application of PCT Patent Application No. PCT/US2010/046365, filed 23 Aug. 2010 also with the USPTO. The Present Disclosure claims priority to each of these Applications. In addition to the aforementioned claims of priority, the Present Disclosure claims priority to U.S. Provisional Application No. 61/235,914, entitled "Optical Fiber Connector," and filed 21 Aug. 2009 also with the USPTO. The contents of each of the aforementioned Applications are fully incorporated in their entireties herein.

BACKGROUND OF THE PRESENT DISCLOSURE

The Present Disclosure generally relates to optical fiber connectors and, more particularly, to connectors with improved latching structure and duplex clip.

Optical fiber connectors are an essential part of substantially any optical fiber based communication system. For instance, such connectors may be used to join segments of fiber into longer lengths, to connect fiber to active devices such as transceivers, detectors and repeaters, or to connect fiber to passive devices such as switches and attenuators. The central function of an optical fiber connector is to maintain or position two optical fiber ends such that the core of one fiber is axially aligned with the core of the other fiber. Consequently, the light from one fiber is coupled to the other fiber or transferred between the fibers as efficiently as possible. This is a particularly challenging task because the light-carrying region or core of an optical fiber is quite small. In single mode optical fibers, the core diameter is about 9 microns. In multi-mode fibers, the core can be as large as 62.5 to 100 microns and, hence, alignment is less critical. However, precise alignment is still a necessary feature to effectively interconnect the optical fibers.

Another function of an optical fiber connector is to provide mechanical stability to and protection for the optical junction in its working environment. Achieving low insertion loss in coupling two optical fibers is generally a function of the alignment of the fiber ends, the width of the gap between the ends, and the optical surface condition of either or both ends.

Precise alignment of the optical fiber is typically accomplished within the design of the optical terminus assembly. The typical optical terminus assembly includes a small cylindrical metal or ceramic ferrule at one end that has a high precision hole passing through its central axis. Glass or plastic optical fiber is secured within the hole of the ferrule using mechanical, adhesive or other retention methods.

In a connection between a pair of optical fibers, the ferrules are butted together in an end-to-end manner and light travels from one to the other along their common central axis.

In order to minimize the loss of light caused by the connection, it is highly desirable for the cores of the glass fibers to be precisely aligned. The ferrules are typically part of a spring loaded assembly that is movable along the central axis of the optical fibers. Upon mating, each ferrule typically moves approximately 0.5 mm away from its unmated position.

In order to expand the range of applications in which optical fiber connectors may be used, plastic housings are sometimes replaced with metal in order to permit the use of optical fiber connectors in extreme temperature, chemical or other environmental conditions. However, such metal housings create challenges relative to the latching structure between components containing the ferrules due to the high precision required and the relatively small distances the ferrules move when mated. That is, metal latch design and construction are challenging in several aspects. First, unlike the plastic housing-latch construction, the metal latch is typically a separate part that must be mounted to housing. Second, a metal latch has its own bending characteristics, which tends to be less stable than that of a plastic latch. Accordingly, additional measures are necessary to ensure that metal latches function correctly.

SUMMARY OF THE PRESENT DISCLOSURE

Accordingly, it is an object to solve the above described problems encountered with existing metal housing optical fiber connectors by providing an improved optical fiber latching structure. More specifically, an optical fiber connector includes a non-polymer housing with at least one elongated cylindrical cavity, a fiber holder within the cavity including a ferrule which secures an optical fiber therein and a biasing member engaging the fiber holder to bias the ferrule towards an unmated position. A resilient metal latch has a mounting portion for securing the latch to the housing, a manually manipulatable portion and at least one latching member for releasably securing the optical fiber connector to another component. A latch travel limiting structure is configured to engage the resilient metal latch and prevent the latch from deflecting outside a desired predetermined path.

If desired, the latch travel limiting structure may include a vertical stop surface to prevent the latch from deflecting away from the metal housing more than a predetermined distance and lateral stop surfaces to prevent the latch from deflecting out of a common plane that extends through a longitudinal axis of the connector and a longitudinal axis of the metal latch. The latch travel limiting structure may be a metal component having a latch receiving hole therein with a portion of the metal latch extending through the latch receiving hole. The optical fiber connector may include a member for securing both the fiber holder within the cavity and the latch travel limiting structure to the optical fiber connector.

If desired, an optical fiber connector may be provided having a housing with at least one elongated cylindrical cavity and a latch mounting projection extending from a surface of the metal housing. A fiber holder may be provided within the said cavity which includes a ferrule which secures an optical fiber therein. A biasing member engages the fiber holder to bias the ferrule towards an unmated position and a resilient metal latch has a W-shaped mounting portion, a manually manipulatable portion and at least one latching member for releasably securing the optical connector to another component. The W-shaped mounting portion may include a pair of resilient spaced apart arms engaging opposite sides of the latch mounting projection.

If desired, the latch mounting projection may include a locking projection extending therefrom and the W-shaped mounting portion of the resilient latch may include an opening through which the latch mounting projection extends. The opening in the W-shaped mounting portion may be circular and a portion of the locking projection positioned within the circular opening may be cylindrical and a portion of the locking projection above the W-shaped mounting portion may be wider than the circular opening in order to secure the latch to the housing. The metal latch may be a generally elongated strip of metal material having first and second ends, with the resilient spaced apart arms of the W-shaped mounting portion projecting from opposite edges of the elongated strip adjacent the first end. The manually manipulatable portion may be located adjacent the second end. The at least one latching projection may be located between the resilient spaced apart arms and the manually manipulatable portion.

The metal latch may further include a pair of latching members located between the resilient spaced apart arms and the manually manipulatable portion, with the latching members projecting from the opposite edges of the elongated strip. A latch travel limiting structure may be provided to engage the resilient metal latch and prevent the latch from deflecting beyond a desired predetermined path. The latch travel limiting structure may be configured to prevent the latch from deflecting away from the metal housing more than a predetermined distance and prevent the latch from deflecting out of a common plane that extends through a longitudinal axis of the connector and a longitudinal axis of the metal latch. The latch travel limiting structure may be a metal component having a hole with a portion of the metal latch extending through the hole.

A generally W-shaped metal holding device for holding two individual optical fiber connectors in a generally parallel side-by-side orientation may be provided. The device includes first and second clamping members with each of clamping member having a base with first and second oppositely facing sides, and a resilient arm extending from the first side of the base. The base and the resilient arm are dimensioned to clamp a respective one of the optical fiber connectors to hold the optical fiber connectors in the substantially side-by-side relationship. A bridge extends from the second side of each base to interconnect the first and second clamping members. A single common insertion opening is located between the resilient arms of each clamp member and aligned with but spaced from the bridge and dimensioned to permit at least a portion of an optical fiber connector assembly to pass through the common insertion opening and into one of the first and second clamp members.

If desired, the metal holding device may be an integrally formed, one-piece member formed of sheet metal material. The base and resilient arm of each clamping member may be arcuately shaped. The bridge may be arcuately shaped and include a radius of curvature, with each base including a radius of curvature and the radius of curvature of the bridge is on a side of the adapter opposite the radius of curvature of each base. Each base may include an opening for receiving a locking projection of an optical fiber connector therein.

A duplex optical fiber connector system includes the generally W-shaped clip to maintaining first and second optical fiber connectors in a generally parallel side-by-side orientation to enable simultaneous mating with a mating component. The base and resilient arm of each clamping member may be arcuately shaped and the base of each clamping member may engage a pair of cutouts in the connector housing. The housing of each optical fiber connector may have a locking projection extending therefrom and into an opening in the base of its respective clamping member.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 11 is a perspective view similar to that of FIG. 9 but showing the installation of the connectors of FIG. 5; and FIG. 12 is a perspective view similar to that of FIG. 10 but showing the installation of the connectors of FIG. 5.

DESCRIPTION OF THE PREFERRED EMBODIMENTS

While the Present Disclosure may be susceptible to embodiment in different forms, there is shown in the Figures, and will be described herein in detail, specific embodiments, with the understanding that the disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
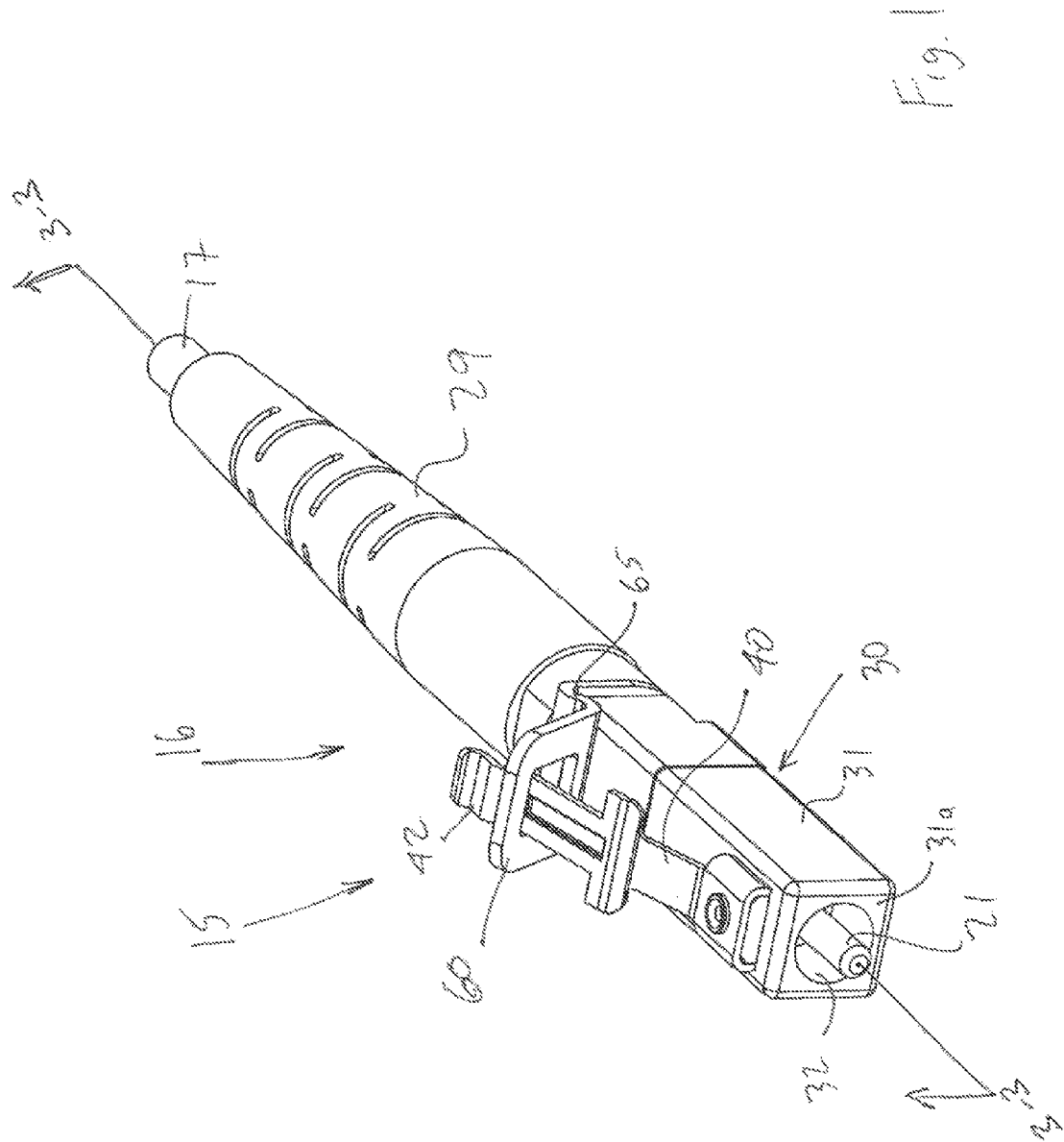
FIG. 1 is a perspective view of one embodiment of an optical fiber connector assembly including the latching structure of the Present Disclosure.
Figure 2:
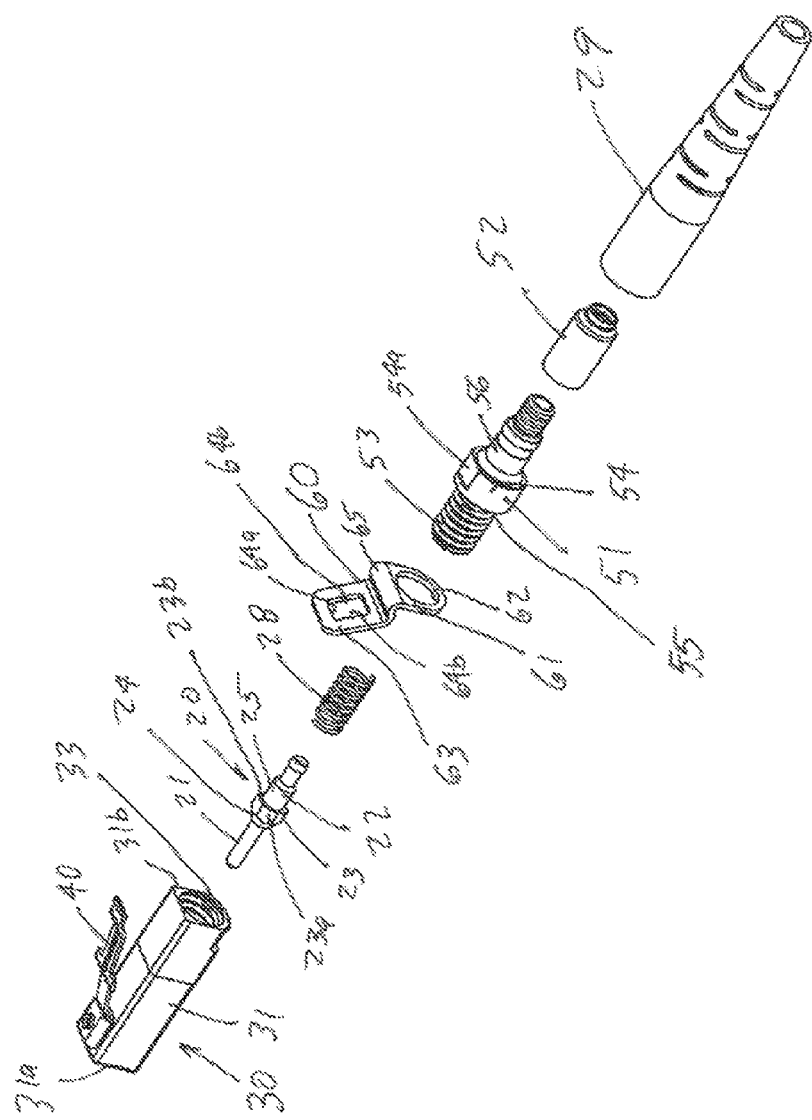
FIG. 2 is an exploded perspective view of the connector of FIG. 1.
Figure 3:
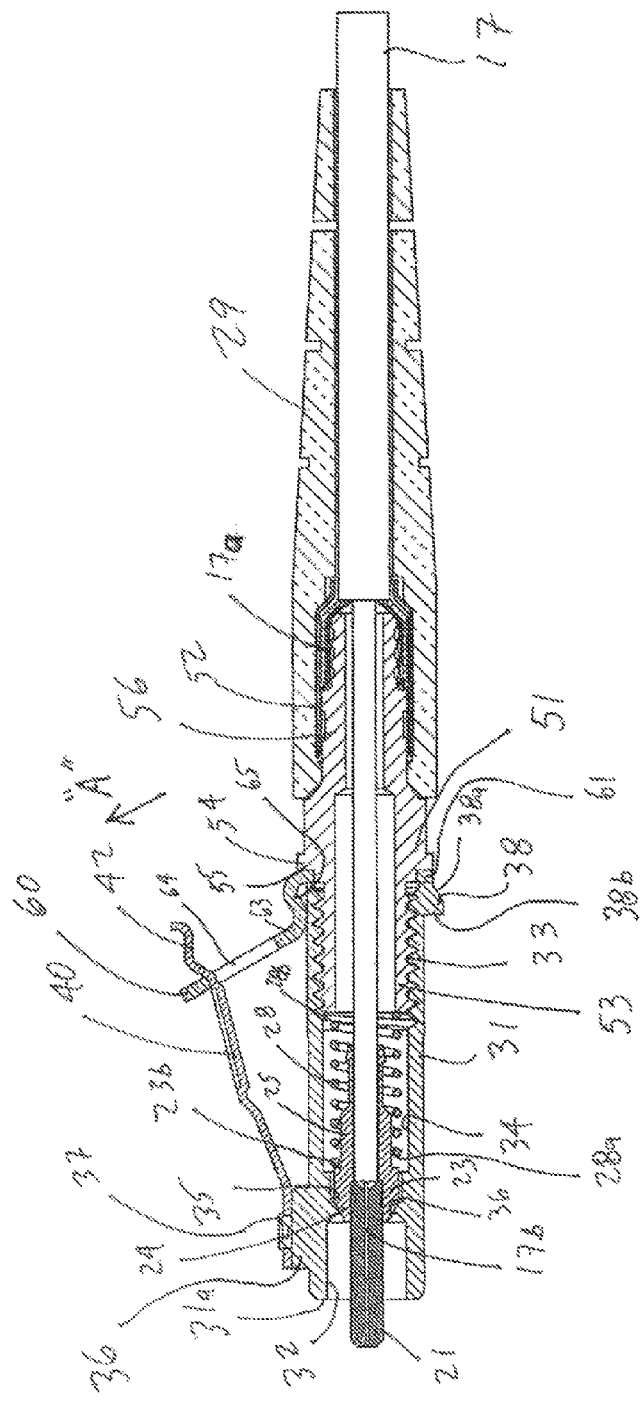
FIG. 3 is a sectional view of the connector of FIG. 1, taken generally along Line 3-3 of FIG. 1.

Referring to FIGS. 1-3, an optical fiber connector assembly 15 is depicted. Optical fiber connector 16 includes a plug or ferrule subassembly 20 for retaining a optical fiber cable 17 therein, a connector housing subassembly 30 in which plug 20 is positioned, and an elastomeric boot 29. Plug 20 is formed of a ceramic ferrule 21 and a metal body 22 in which ferrule 21 is retained by either a press-fit or an adhesive. Metal body 22 is a generally cylindrical, hollow member with a collar 23 having a frusta-conical leading end 24 extending therefrom. As depicted, collar 23 has a series of facets or flat surfaces 23*a* on the outer surface thereof. Cylindrical body section 25 has a diameter smaller than that of collar 23 and thus forms a shoulder 23*b* against which one end of spring 28 abuts. Body 22 is formed of a copper alloy although other materials with similar properties and characteristics could be used.

Connector housing subassembly 30 includes a housing 31 having a generally rectangular outer surface and a generally cylindrical bore with a series of sections having different inner diameters. Leading end 31*a* of housing 31 has a circular mating bore 32 from which ferrule 21 extends. Mating bore 32 is dimensioned to receive a cylindrical post 91 (FIG. 7) of a mating component or adapter 90. Rear end 31*b* of housing 31 has a relatively large threaded bore 33 for receiving the threaded leading end 53 of crimp body 51. Central cavity 34 is located between mating bore 32 and threaded bore 33 and is dimensioned to receive body section 25 of plug 20 and spring 28 therein. Collar engaging bore 35 is located between mating bore 32 and central cavity 34 and is dimensioned to received collar 23 of plug 20 therein. More specifically, bore 35 is dimensioned to received collar 23 therein. The leading edge of bore 35 tapers to form a frusta-conical section 36 that leads into mating bore 32 and engages frusta-conical leading end 24 of collar 23.

Figure 9:
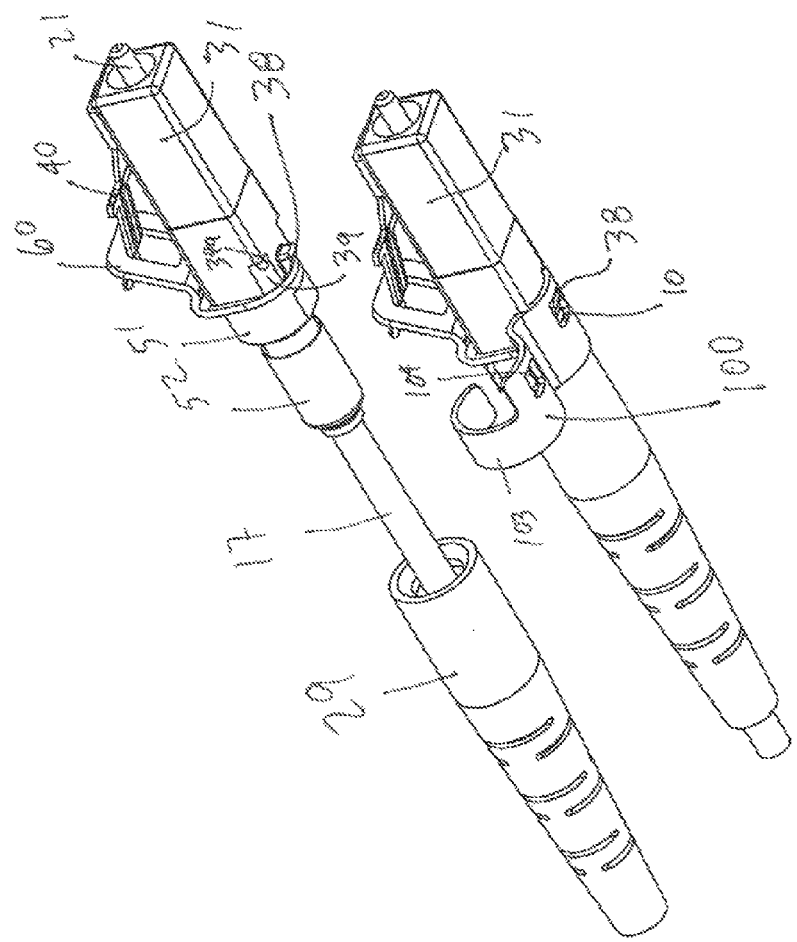
FIG. 9 is a perspective view of the duplex clip of FIG. 8 with the connector of FIG. 1 secured therein and a second connector assembly positioned prior to insertion of the second connector assembly into the clip.
Figure 10:
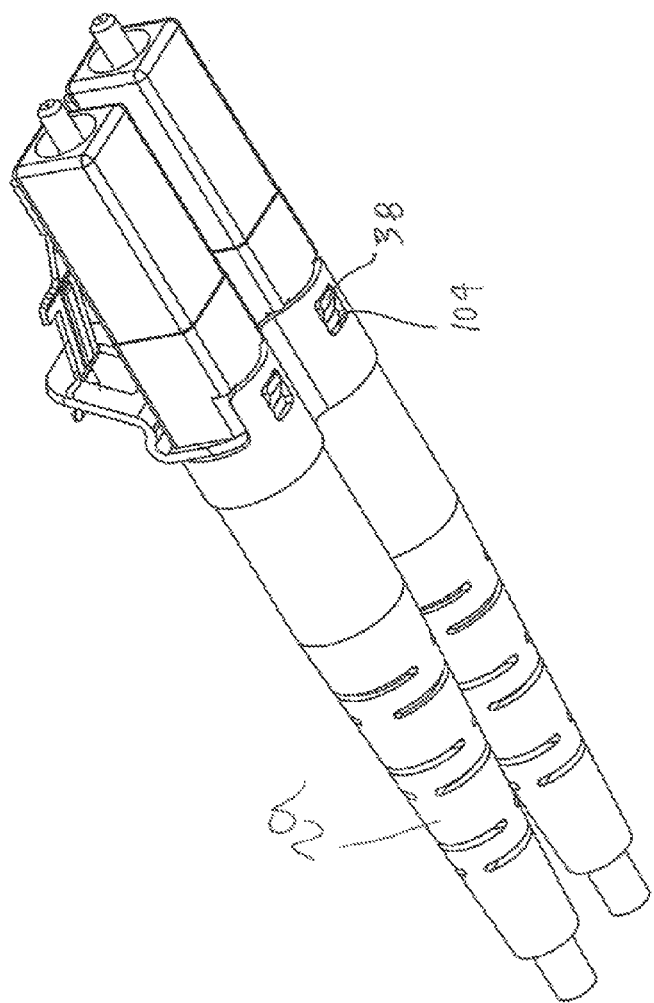
FIG. 10 is a perspective view similar to that of FIG. 9 but with both connectors secured in the clip.

Housing 31 includes a raised latching block or projection 36 generally adjacent leading end 31*a* thereof for securing latch 40 on an outer surface of housing 31. Raised latching block 36 is generally rectangular and includes a pair of tapered edges 36*a* for guiding the mounting of latch 40 onto the block. A cylindrical head or projection 37 extends upward from body 36 for locking latch 40 in place. Duplex-locking or retention projection 38 is positioned on housing 31 on its lower surface or the surface opposite raised block 36 and latch 40. Duplex retention projection 38 has a ramped surface 38*a* that tapers rearwardly towards the central axis of connector 16. A forwardly facing shoulder 38*b* is used to secured connector assembly 16 to duplex clip 100 if desired. In addition, a pair of cutouts or notches 39 (FIG. 9) may be provided on opposite sides of projection 38 in order to create shoulders 39*a* for retaining optional duplex clip 100. Housing 31 is formed of aluminum although other materials of similar properties and characteristics could be used.

Latch 40 is a cantilevered structure formed of sheet metal and includes a generally W-shaped mounting portion 41, a manually manipulatable portion or tab 42 and a pair of locking fingers 43 extending from opposite sides of latch 40 between tab 42 and mounting portion 41. W-shaped mounting portion 41 includes a flat mounting plate 44 for positioning on a top surface 36*b* of raised block 36 and a pair of downwardly depending, resilient arms 45. Arms 45 are somewhat curved and the distance between the tips 45*a* thereof is dimensioned so as to be slightly less than the lateral width of raised block 36 so that arms 45 deflect upon engagement of latch 40 with raised block 36. A circular hole 46 is provided through mounting plate 44 through which cylindrical head 37 extends. Latch 40 is formed of beryllium copper although other materials of similar properties and characteristics could be used.

Figure 4:
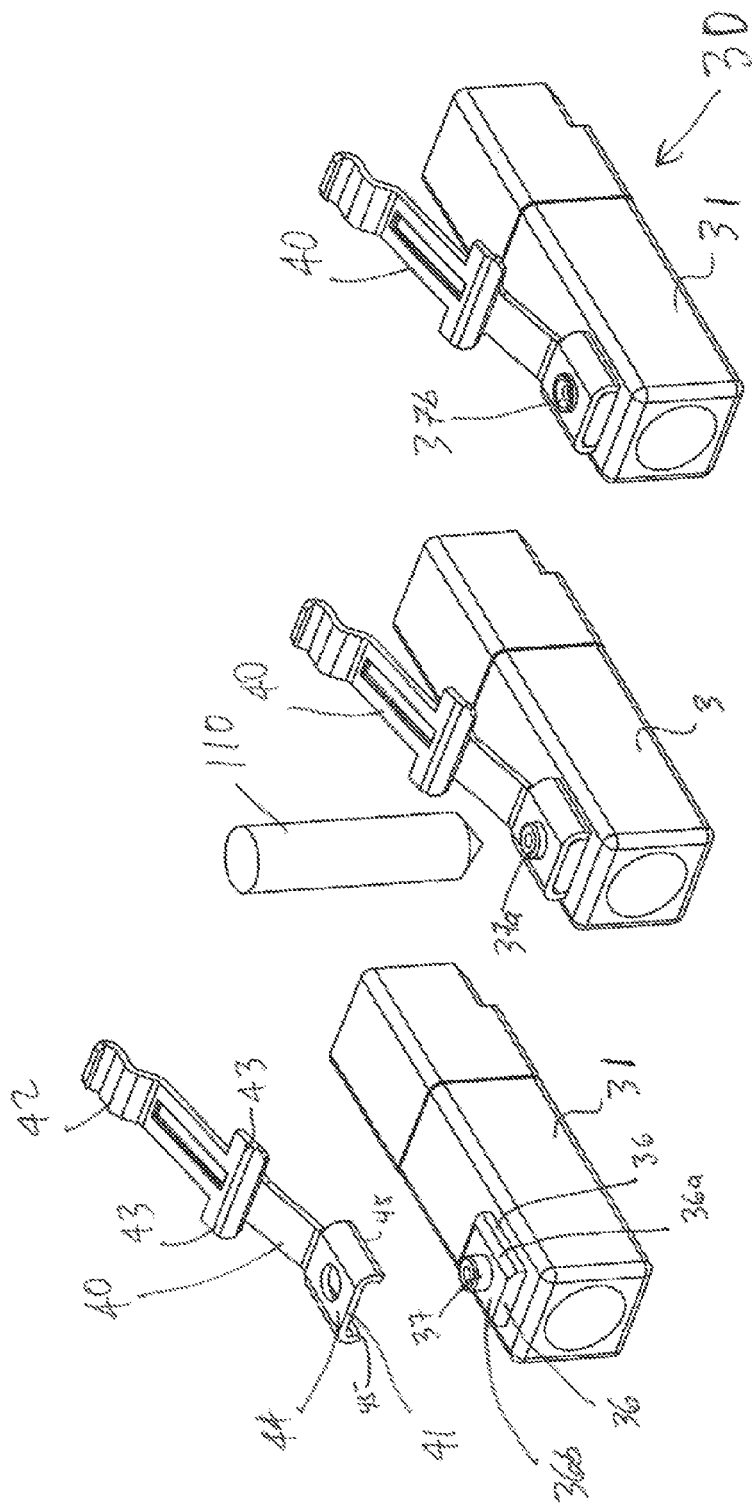
FIG. 4A is a perspective view of the connector housing with the latch mechanism spaced therefrom prior to mounting the latch on the housing.
FIG. 4B is a perspective view similar to FIG. 4A in which the latch is mounted on the housing and a tool is positioned above the housing and latch assembly.
FIG. 4C is a perspective view similar to FIG. 4B but after the tool has engaged the housing to secure the latch to the housing.

Referring to FIGS. 4A-4C, upon positioning latch 40 on raised block 36 with cylindrical head 37 extending through hole 46 of latch 40, the latch will remain in place on the raised block due to the gripping action of arms 45 on the side surfaces 36*c* of raised block 36. A swaging tool or pin 110 is then be used to contact the center of top surface 37*a* of cylindrical head 37 in order to deform the portion of cylindrical head 37 that extends above mounting plate 44 and create a swaged head 37*b* that extends over mounting plate 44 and is larger in diameter than hole 46 to secure latch 40 on housing 31. The engagement between side surfaces 36*c* and resilient arms 45 will prevent rotation of latch 40 around cylindrical head 37 even if the interconnection due to the swaged head 37*b* loosens.

The crimping aspect includes a metal crimp body 51 and a metal crimp tube 52. Crimp body 51 is a generally cylindrical, hollow member with a threaded leading end 53 that is dimensioned to be inserted and rotated within threaded bore 33 of rear end 31*b* of housing 31 in order to secure crimp body 51 to housing 31 and retain plug 20 therein. Crimp body 51 has a tool collar 54 with flat surfaces 54*a* on opposite sides thereof to facilitate engagement of the collar in order to rotate crimp body 51 relative to housing 31. A forwardly facing shoulder 55 having a diameter smaller than that of tool collar 54 is positioned at the junction of threaded leading end 53 and tool collar 54. A smaller diameter crimp section 56 is located at the rear end of crimp body 51 and receives crimp tube 52 thereon. Crimp body 51 and crimp tube 52 are dimensioned so as to permit the strength member 17*a* of the optical fiber cable 17 to be positioned between the crimp tube 52 and the crimp section 56 of crimp body 51. Upon applying a sufficient force, crimp tube 52 deforms around the strength member 17*a* of the optical fiber cable 17 and into recesses in crimp section 53 in order to retain the optical fiber cable 17. Crimp body 51 is formed of a first type of aluminum and crimp tube 52 is made of a second, softer type of aluminum although other materials of similar properties and characteristics could be used as long as the crimp body is sufficiently strong and the crimp tube is sufficiently soft. Elastomeric boot 29 is positioned on the rear end of connector 16 and acts as a strain relief and limits the bending of optical fiber cable 17 as it exits the connector 16.

Compression spring 28 is positioned between plug 20 and crimp body 51 with the leading end 28*a* of compression spring 28 engaging shoulder 23*b* of collar 23 and the rear end 28*b* of spring 28 engaging the leading edge 51*a* of crimp body 51. Plug 20, housing 31 and crimp body 51 are dimensioned so that spring 28 forces frusta-conical leading end 24 of collar 23 into engagement with frusta-conical section 36 of bore 35 when the connector 16 is not mated to another component such as a connector. Upon mating with another component, ferrule 21 will engage such other component with sufficient force to overcome the force of spring 28 and plug 20 will move rearwardly relative to housing 31.

Latch protection member 60 is a structure that limits the travel of latch 40 and is positioned between rear end 31*b* of housing 31 and forwardly facing shoulder 55 of crimp body 51. Latch protection member includes a mounting section 61 with a circular opening 62 through which threaded leading end 53 of crimp body 51 extends. An angled arm 63 extends forwardly relative to mounting section 61 and includes a rectangular opening 64 therein. A generally S-shaped transition section 65 interconnects mounting leg 61 and angled arm 63. Manually manipulatable tab 42 extends through rectangular opening 64. The upper surface 64*a* of opening 64 limits the distance that latch 40 may deflect away from housing 31 as shown by arrow "A." As a result, latch 40 is prevented from becoming unlatched from a mating component due to movement of latch 40 away from housing 31. In addition, side surfaces 64b of opening 64 prevent latch 40 from moving laterally. As a result, latch 40 is constrained to move within a plane extending through the longitudinal axis of latch 40 and the central axis of connector assembly 15. Latch protection member is formed of stainless steel although other materials of similar properties and characteristics could be used.

Assembly of optical connector assembly 15 generally encompasses the following steps. First, the various elements of the housing 31 are installed therein, and the crimp body 51 is screwed into the housing 31. This forms a "connector head." Second, an end of the plug 20 is inserted into the "connector head" and adhesive is then injected into the plug 20. Third, the crimp body 51 and crimp tube 52 are threaded onto the cable 17, which is then prepared for termination. Fourth, the cable 17 is inserted into the "connector head," and crimped. Finally, the device is polished, and the elastomeric boot 29 is slid on.

Figure 5:
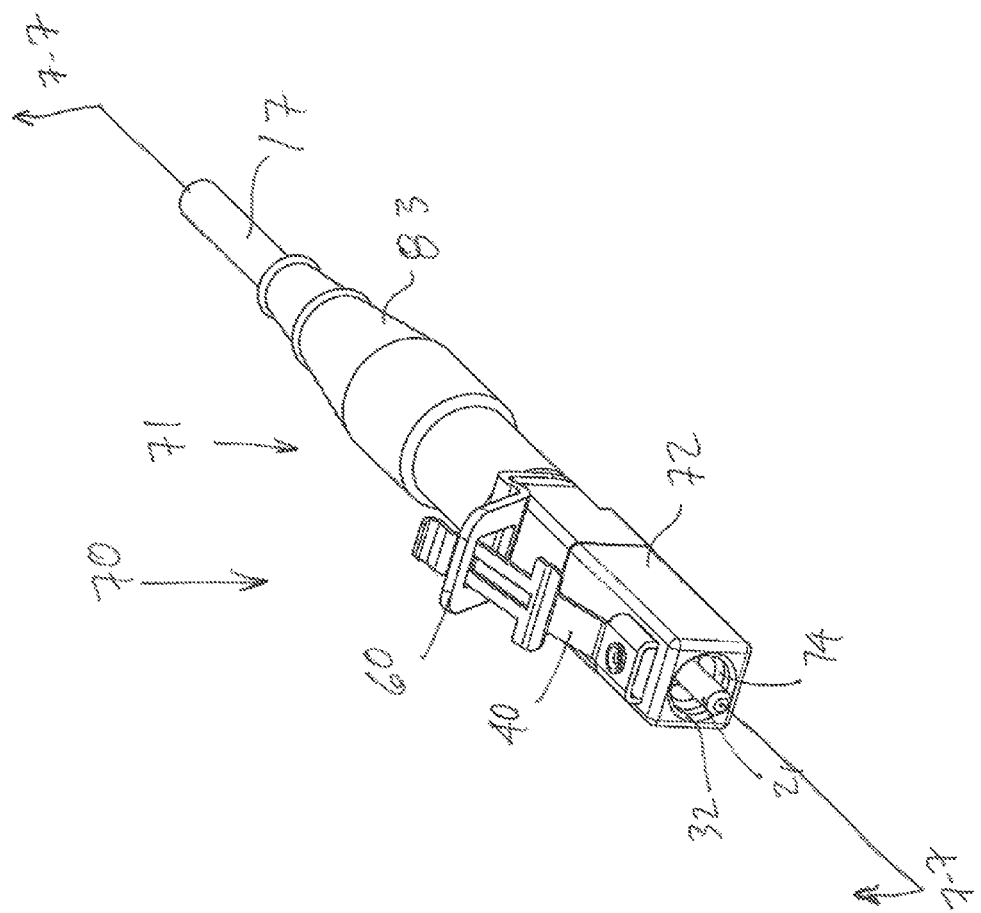
FIG. 5 is a perspective view of another embodiment of an optical fiber cable assembly including the latching structure of the Present Disclosure.
Figure 6:
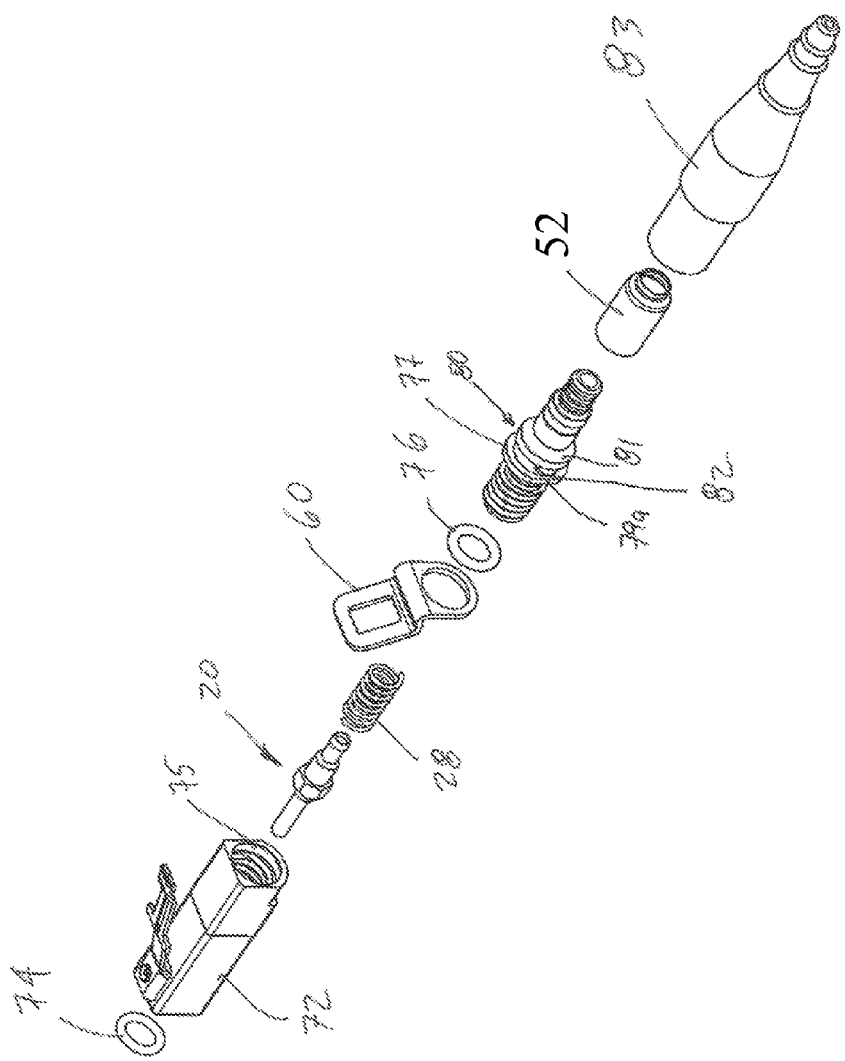
FIG. 6 is an exploded perspective view of the connector of FIG. 5.
Figure 7:
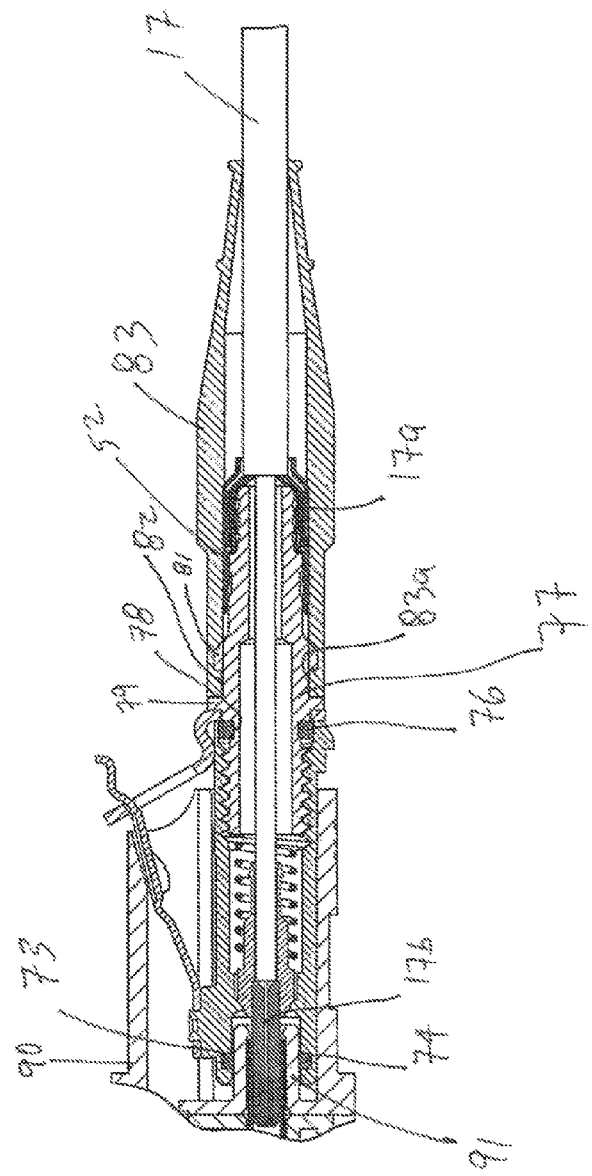
FIG. 7 is a sectional view of the connector of FIG. 5, taken generally along line 7-7 of FIG. 5 and with the connector assembly mated into an optical fiber adapter.
Figure 8:
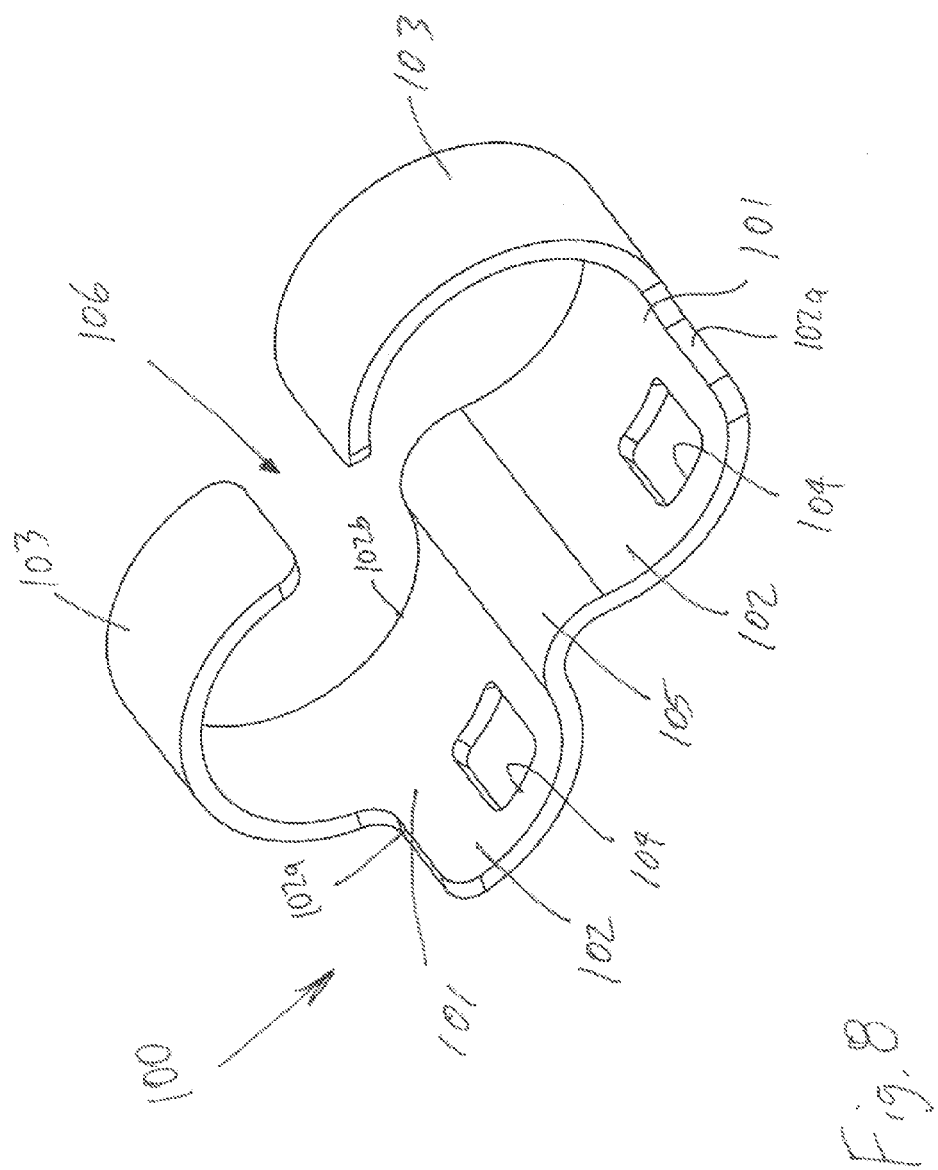
FIG. 8 is a perspective view of duplex clip for creating a duplex connector assembly.

Referring to FIGS. 5-7, an alternate embodiment of an optical fiber connector assembly 70 is depicted that is similar to connector assembly 15 except that connector assembly 70 includes structure for environmentally sealing the connector. During the description of connector assembly 70, like reference numbers are used with respect to like elements and the description of such elements is omitted. Optical fiber connector 71 includes a plug subassembly 20, a connector housing subassembly 72 and elastomeric boot 83. Housing 72 is similar to housing 31 except that housing 72 includes an annular recess 73 within circular mating bore 32 from which ferrule 21 extends. A rubber or silicone O-ring 74 is secured within recess 73 in order to create an environmental seal between optical fiber connector 70 and projection 91 of adapter 90 as best seen in FIG. 7. In addition, the rear end 72b of housing 72 includes an annular groove 75 in which center O-ring 76 is positioned.

Metal crimp body 77 is similar to metal crimp body 51 except that metal crimp body 77 includes an annular groove 78 between threaded leading end 53 and tool collar 79 for receiving rubber or silicone O-ring 76 therein. Tool collar 79 includes a pair of flat surfaces 79a on opposite sides thereof to facilitate engagement of the collar by an appropriate tool in order to rotate crimp body 77 relative to housing 72. Crimp body 77 includes a boot engaging section 80 having an annular projection 81 which creates an annular groove 82 between tool collar 79 and annular projection 81. Annular projection 81 and annular groove 82 combine to engage an inner-surface 83a of elastomeric boot 83 in order to secure the elastomeric boot on crimp body 72 and crimp tube 52 with a reliable environmental seal.

Elastomeric boot 83 is similar to the elastomeric boot 29 of the first embodiment depicted in FIGS. 1-3 except that the elastomeric boot 79 is formed of a softer, more flexible material to create a better seal. In addition, boot 83 projects forward over crimp body 72 to a location immediately adjacent tool collar 79 and the rear end 83b of elastomeric boot 83 is configured to engage optical fiber cable 17 so as to provide an environmental seal between the elastomeric boot 83 and optical fiber cable 17.

Optical fiber connector assembly 70 is assembled in a manner similar to that of optical fiber connector assembly 15, as described above.

Referring to the Figures, a metal duplex clip 100 may be provided if it is desired to interconnect a pair of optical fiber connectors 15, 70 in order to form a duplex connector assembly 110. Metal clip 100 includes a pair of clamping or locking members 101 that have identical components but are the "mirror image" of each other. Each locking member includes an arcuate base 102 and an arcuate locking arm 103 extending from a first or outer side or edge 102a of arcuate base 102 adjacent the rear edge 102b of arcuate base 102. As depicted, arcuate locking arms 103 are narrower in a direction parallel to the axis of the optical fiber cable 17 and are dimensioned so as to be somewhat flexible in order to facilitate mounting of the optical fiber connector assemblies 15, 70 in duplex locking clip 100. Arcuate base 102 also includes a window or opening 104 for lockingly receiving the duplex retention projection 38 of housing 31 therein. An arcuate bridge or connection section 105 interconnects the two locking members 101 and is curved in an opposite direction as compared to the curvature of each arcuate base 102. In other words, the axis about which bridge 105 is curved is on one side of the bridge 105 while the axes about which the arcuate bases 102 are curved, respectively, are on the opposite side of bridge 105.

Through such a configuration, a single, common insertion opening 106 is created between the ends 103a of locking arms 103 through which all or a portion of a connector assembly is slid before the connector assembly is locked within one of the clamping members 101. As depicted, the two arcuate bases 102 and connection section 105 will have some flexibility but the primary deflection when mounting the optical fiber connector assemblies 15, 70 within duplex locking clip 100 will occur through arcuate locking arms 103 since they are narrower in width relative to the longitudinal axes of the connectors. As depicted, clip 100 is integrally formed as a one-piece member stamped, although clip 100 could be formed from multiple components and other materials of similar properties and characteristics.

When inserting optical fiber connector assembly 15 of the first embodiment into clip 100, a first connector assembly with its elastomeric boot 29 on cable 17 but spaced from the rest of the connector assembly is positioned so that its central axis is generally parallel to the central axes 101a of clamping members 101 but is spaced from and laterally aligned with insertion opening 106. The connector assembly is positioned such that the optical fiber cable 17 rather than the connector is aligned with opening 106. The connector assembly 15 is then moved laterally so that the cable 16 slides through opening 106 and the assembly is moved laterally within clip 100 to either of the clamping members. Connector assembly 15 is then slid along its central axis until duplex retention projection 38 slides into window 104 of base 102 to lock the connector assembly to clip 100. Arcuate base 102 is positioned in cutouts 39 in order to secure base 102 between the shoulders 39a created by cutouts 39 and projection 38. The second optical fiber connector assembly is then inserted in a similar manner into the other clamping member. Once both assemblies have been inserted into their respective clamping members, the elastomeric boots 29 are slid into place on the connector assemblies. If desired, an alternate manner of assembly is to insert the first connector assembly into clip 100, slide its elastomeric boot into place and then repeat the process with the second connector assembly.

When inserting optical fiber connector assembly 70 of the second embodiment into clip 100, the process is identical to that of the connector assembly 15 of the first embodiment except that the elastomeric boot 83 may already be slid into place on the connector assembly. This is due to elastomeric boot 83 being softer than elastomeric boot 29 of the first embodiment. As a result, elastomeric boot 83 will deflect to some degree and thus reduce the amount of deflection required by locking arms 103. Depending on the material used and the configuration of the clip 100, it may, under some circumstances be possible to use this process with the connector assembly of the first embodiment.

While a preferred embodiment of the Present Disclosure is shown and described, it is envisioned that those skilled in the art may devise various modifications without departing from the spirit and scope of the foregoing Description and the appended Claims.

What is claimed is:

1. A generally W-shaped metal clip for holding two individual optical fiber connectors in a generally parallel side-by-side orientation comprising:

first and second clamping members, each of said clamping members having a base with first and second oppositely facing sides, and a resilient arm extending from the first side of the base, the base and the resilient arm being dimensioned to clamp a respective one of the optical fiber connectors to hold the optical fiber connectors in the substantially side-by-side relationship;

a bridge extending from the second side of each base to interconnect the first and second clamping members; and a single common insertion opening positioned between the resilient arms of each clamp member and aligned with but spaced from the bridge and dimensioned to permit at least a portion of an optical fiber connector assembly to pass through the common insertion opening and into one of the first and second clamp members.

2. The generally W-shaped metal clip of claim 1, wherein the clip is an integrally formed, one-piece member formed of sheet metal material.

3. The generally W-shaped metal clip of claim 2, wherein the base and resilient arm of each clamping member are arcuately shaped.

4. The generally W-shaped metal clip of claim 3, wherein the bridge is arcuately shaped.

5. The generally W-shaped metal clip of claim 4, wherein the bridge includes a radius of curvature.

6. The generally W-shaped metal clip of claim 5, wherein each base includes a radius of curvature.

7. The generally W-shaped metal clip of claim 6, wherein the radius of curvature of the bridge is on a side of the clip opposite the radius of curvature of each base.

8. The generally W-shaped metal clip of claim 7, wherein each base includes an opening for receiving a locking projection of an optical fiber connector therein.

9. A duplex optical fiber connector system for maintaining first and second optical fiber connectors in a generally parallel side-by-side orientation to enable simultaneous mating with a mating component, comprising:

a generally W-shaped metal clip for holding the first and second optical fiber connectors in a generally parallel side-by-side orientation including first and second clamping members, each of the clamping members having a base with first and second oppositely facing sides, and a resilient arm extending from the first side of the base, the base and the resilient arm being dimensioned to clamp a respective one of the optical fiber connectors to hold the optical fiber connectors in the substantially side-by-side relationship, a bridge extending from the second side of each base to interconnect the first and second clamping members and a single common insertion opening positioned between the resilient arms of each clamping member and aligned with but spaced from the bridge and dimensioned to permit at least a portion of an optical fiber connector assembly to pass through the common insertion opening and into one of the first and second clamping members; and a first optical fiber connector secured to the first clamping member and a second optical fiber connector secured to the second clamping member, each connector having a housing with at least one elongated cylindrical cavity, a fiber holder within the cavity, the fiber holder including a ferrule which secures an optical fiber therein, and a biasing member engaging the fiber holder to bias the ferrule towards a position extending out of the housing.

10. The duplex optical fiber connector system of claim 9, wherein the clip is an integrally formed, one-piece member formed of sheet metal material.

11. The duplex optical fiber connector system of claim 10, wherein the base and resilient arm of each clamping member are arcuately shaped.

12. The duplex optical fiber connector system of claim 11, wherein the base of each clamping member engages one of the connector housings.

13. The duplex optical fiber connector system of claim 12, wherein the connector housing includes a pair of cutouts on a surface that engages the base.

14. The duplex optical fiber connector system of claim 10, wherein the housing of each optical fiber connector has a locking projection extending therefrom and into an opening in the base of its respective clamping member.

* * * * *